DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 19, 1972

905 O.G. 453

T905,006

COMPOSITION FOR STRIPPING COATINGS FROM SUBSTRATES

Lou P. Johnson, 407 Whispering Way, and Parker J. Trent, Rte. 5, both of Kingsport, Tenn. 37660

Continuation of abandoned application Ser. No. 20,857, Mar. 18, 1970. This application Oct. 26, 1971, Ser. No. 192,311

Int. Cl. C09d *9/00;* C11d *7/06, 7/32*

U.S. Cl. 252—153

No Drawing. 19 Pages Specification

A stripping composition for removing water-emulsion or metal-complex coatings from substrates such as floors is disclosed. Such coatings are commonly used as floor polish. The composition comprises a solution of phenyldiethanolamine, an alkali sufficient to raise the pH of the composition to above about 10.0, and the concentration of the phenyldiethanolamine between about 0.1 and about 5.0% by weight. Alkalies such as sodium carbonate, trisodium phosphate, sodium metasilicate, sodium orthosilicate, potassium hydroxide, ammonium hydroxide, diethanolamine, morpholine and 2-diethylaminoethanol are suitable. Small amounts of detergents and an alcohol such as isopropanol may be included in the formulation. The compositions are especially effective in removing aged floor polish film. They do not damage floor coverings and are free from the irritating odors of conventional ammonia-based strippers.